US006769830B1

(12) United States Patent
Nygren

(10) Patent No.: US 6,769,830 B1
(45) Date of Patent: *Aug. 3, 2004

(54) CONNECTOR ASSEMBLY

(75) Inventor: William D. Nygren, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/610,594

(22) Filed: Jul. 5, 2000

(51) Int. Cl.[7] .............................. F16B 21/00; F16B 7/18
(52) U.S. Cl. ...................... 403/322.1; 403/13; 403/343; 403/229; 403/315; 411/916; 29/446
(58) Field of Search ............................ 411/366, 6, 354, 411/916; 29/446; 403/343, 322.1, 13, 229, 315

(56) References Cited

U.S. PATENT DOCUMENTS

| | | | |
|---|---|---|---|
| 2,771,647 A | | 6/1953 | Hemstreet ................... 22/113.5 |
| 3,302,960 A | | 2/1967 | Herrmann ................... 287/119 |
| 3,317,220 A | * | 5/1967 | Bruning ......................... 285/1 |
| 3,405,593 A | | 10/1968 | Kriesel .......................... 85/33 |
| 3,887,150 A | | 6/1975 | Jakubowski, Jr. ........ 244/137 R |
| 3,926,090 A | | 12/1975 | Bunker .......................... 85/33 |
| 4,002,120 A | | 1/1977 | Swales, deceased et al. ........... 102/49.5 |
| 4,132,147 A | * | 1/1979 | Contaldo |
| 4,350,074 A | * | 9/1982 | Rouget et al. |
| 4,507,034 A | | 3/1985 | Lew et al. ..................... 411/21 |
| 4,520,711 A | | 6/1985 | Robinson ................... 89/1.5 D |
| 4,655,657 A | | 4/1987 | Duran ........................ 411/348 |
| 4,850,774 A | | 7/1989 | Weaver et al. .............. 411/298 |
| 5,060,888 A | | 10/1991 | Vezain et al. ............ 244/158 R |
| 5,129,753 A | | 7/1992 | Wesley et al. .............. 403/322 |
| 5,150,770 A | * | 9/1992 | Secci |
| 5,160,233 A | | 11/1992 | McKinnis .................... 411/433 |
| 5,312,152 A | * | 5/1994 | Woebkenberg et al. |
| 5,364,046 A | * | 11/1994 | Dobbs et al. |
| 5,520,476 A | | 5/1996 | Marks et al. ............... 403/322 |
| 5,603,595 A | * | 2/1997 | Nygren, Jr. |
| 5,695,306 A | | 12/1997 | Nygren, Jr. .................. 411/433 |
| 5,718,531 A | | 2/1998 | Mutschler, Jr. et al. ....... 403/28 |
| 5,722,709 A | * | 3/1998 | Lortz et al. |
| 5,743,492 A | | 4/1998 | Chan et al. ............... 244/118.2 |
| 6,095,736 A | | 8/2000 | Miller et al. ................. 411/352 |
| 2002/0102130 A1 | * | 8/2002 | Nygren et al. .............. 403/337 |

* cited by examiner

Primary Examiner—Lynne H. Browne
Assistant Examiner—Ernesto Garcia
(74) Attorney, Agent, or Firm—Marsh Fischmann & Breyfogle LLP

(57) ABSTRACT

A separable connector assembly includes a connecting member having a threaded end, and a hollow housing having a cylindrical wall that contains a body rotatably mounted therein. This body is threadably engageable with the threaded end of the connecting member. A first mechanism releasably restrains the body from rotating, and a second mechanism is included for winding a spring about the cylindrical wall of the housing. A third mechanism is included for releasing the spring. A fourth mechanism is included for restraining the threaded end from rotating. A fifth mechanism is included for applying a selected tensile load. When the load is applied, a thread geometry of the connecting member causes the load to be resolved as a torque applied to the body sufficient to cause the body to rotate enabling the connecting member to translate out of engagement with the body and subsequently separate from the body.

17 Claims, 6 Drawing Sheets

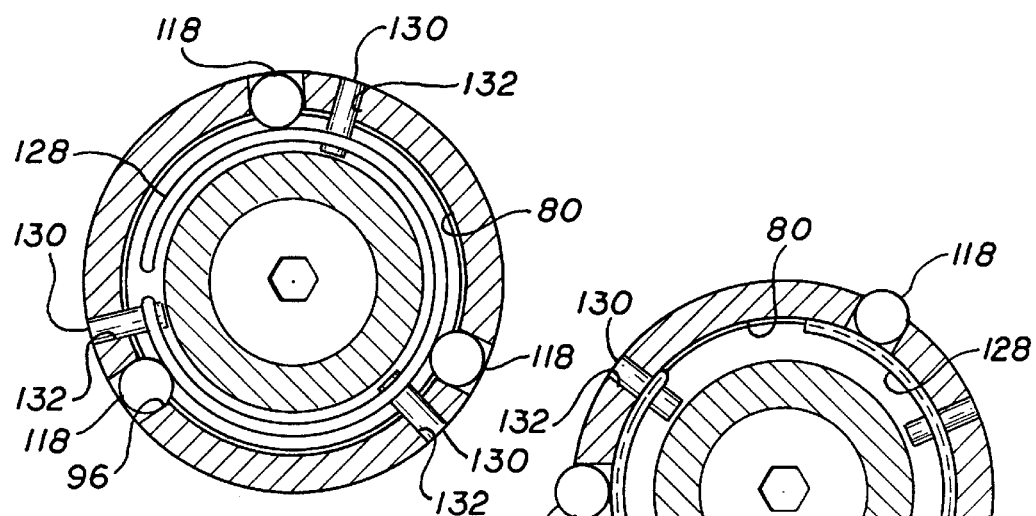
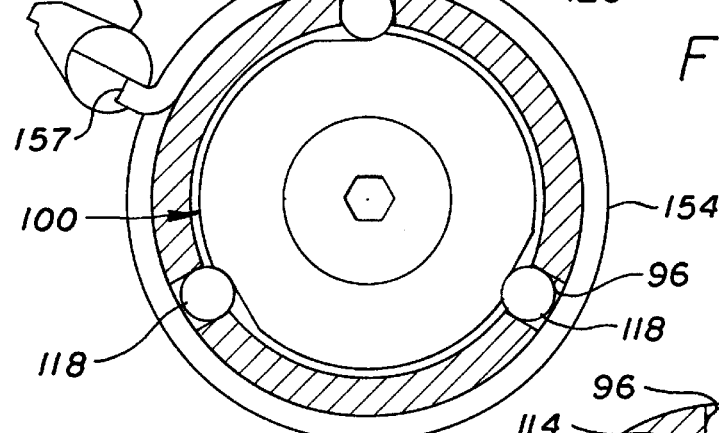
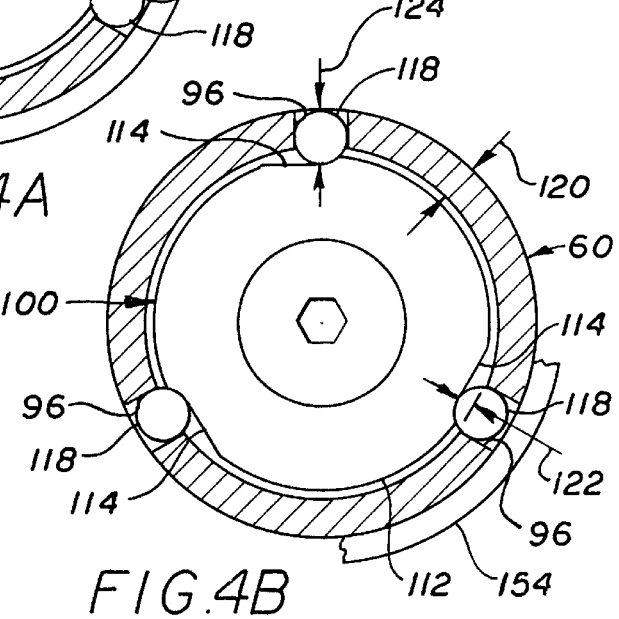

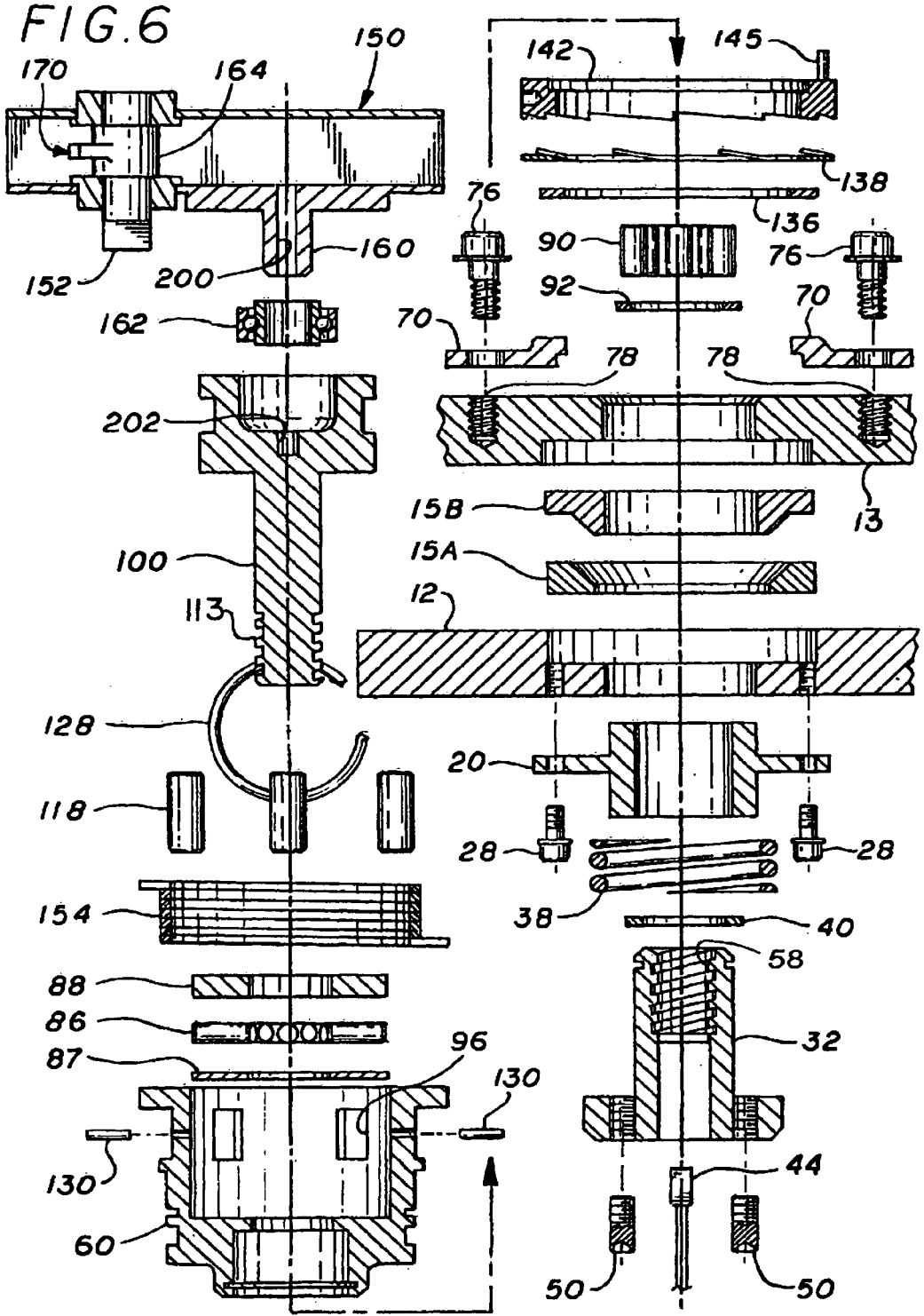

CONNECTOR ASSEMBLY

BACKGROUND OF THE INVENTION

1. Field of the Invention

The invention relates to the field of fasteners and, in particular, to a non-pyrotechnic fastener that automatically separates a nut from a bolt upon actuation.

2. Description of Related Art

Reliable fasteners that separate upon actuation have many applications. One critical application is on launch vehicles designed to place a spacecraft into orbit. Not only must the fasteners reliably secure booster stages together under high loads, they must rapidly separate upon actuation in order to achieve proper timing of stage separation. This is particularly true when several fasteners must be simultaneously separated. Thus pyrotechnically actuated devices are typically used. An extreme example is an explosive actuated system that uses a metal coupling to join the segments of the fairing together. A tubular member is positioned next to or within the coupling. Upon ignition, the explosive expands the tubular member, which in turn fractures the coupling. Such a system is disclosed in U.S. Pat. No. 5,443,492 "Payload Housing And Assembly Joint For A Launch Vehicle" by A. L. Chan, et al.

However, pyrotechnic fasteners and the like, while well proven, can not be tested prior to use, thus must be assembled with great care. This makes them generally expensive to manufacture. Special storage areas must be set aside for any device containing explosives. They are always subject to inadvertent actuation, and, therefore, handled with great care. Additionally, they are particularly subject to ignition by electromagnetic interference (EMI) and thus must be protected by EMI shielding devices, which also raises the cost. One of the most important disadvantages is that upon actuation, most generate significant shock loads, which can damage nearby equipment.

One approach to eliminate such problems is to use shape memory alloys to actuate the fasteners. Shape memory alloys offer a solution to the problem. There are basically two types of shape memory alloys:

1. Simple memory alloys where a deformation undergone in an austenitic state is definitively cancelled out during the passage to the austenitic state.
2. Reversible memory alloys where a deformation undergone in the martensitic state is cancelled out during the passage into the austenitic state, but is reassumed during a subsequent passage to the martensitic state. However, the transformation takes place with a certain hysteresis.

There are numerous alloys having shape memory characteristics such as Ti—Ni, Au—Cd, In—Zn, Ti—Ni—Cu, Cu—Zn—Al and Cu—al—Ni, and many are commercially available. The theory of shape memory alloys is well established and, therefore, need not be discussed in further detail.

There are many examples of fasteners making use of a shape memory alloy (SMA). For example, U.S. Pat. No 5,312,152 "Shape Memory Metal Actuated Separation Device" by W. H. Woebkenberg, Jr., et al. uses a segmented nut that is kept in engagement with a threaded bolt by a retainer. The retainer is held in place by a SMA element. Upon heating of the SMA element, it returns to its un-deformed state and releases the retainer, which in turn releases the nut. U.S. Pat. No 5,722,709 "Separation Device Using A Shape Memory Alloy Retainer" by B. K. Lortz also uses a segmented nut. However, in this case the nut is retained in contact with the threaded bolt by a SMA collar. Upon heating, it expands to its original shape releasing the segmented nut. Other examples of fasteners using shape memory alloys can be found in U.S. patent applications Ser. No. 5,060,888 Temporary Linking Device Especially For An Artificial Satellite Lengthening Piece, And Method To Free Such A Link" by G. Vezain, et al., U.S. Pat. No. 5,129,753 "Shape Memory Wire Latch Mechanism" by K. S. Wesley, et al., U.S. Pat. No. 5,150,770 "Recharge Device, Particularly For Drive Mechanisms For Extending And Withdrawing Operative Members Of A Space Vehicle" by G. Secci and U.S. Pat. No. 5,718,531 "Low Shock Release Device" by E. C. Mutschleer, Jr. All use SMA materials as the primary actuating force. However, when using SMA material as the primary actuating device, precise timing of the release can prove difficult to achieve. In addition, shape memory alloys are sensitive to high temperature environments.

Another approach is the use of ball latches. U.S. Pat. No. 3,887,150 "Internal Ejector Mechanism" by T. Jakubowski, Jr., 132,147 "Store Retention And Release Mechanism" by A. Contaldo, U.S. Pat. No. 4,350,074 "Mechanical And Electrical Coupling Device Fore Charges, Particularly Military Charges" by J. P. Rouget, et al., U.S. Pat. No. 4,520,711 Loop Retention Device For Hook Operated Bomb Arming Solenoids"by P. R. Robinson, U.S. Pat. No. 5,364,046 "Automatic Compliant Capture And Docking Mechanism for Spacecraft" by M. E. Dobbs, et al., and U.S. Pat. No. 5,520,476 "Tie-Down And Release Mechanism For Spacecraft" by G. W. Marks, et al. all disclose the use of ball détente mechanisms to secure components of one type or another together. The main problem with such ball latch fasteners is limited trigger force reduction, which is required for activation with SMA systems. In launch vehicles and spacecrafts, which are subjected to very large vibration loads, the satellite(s) must be secured using very high pre-loaded joints. Ball latch systems typically don't allow for the application of the type of pre-loads that can be obtained with a threaded fastener. However, they are very good locking devices.

In U.S. Pat. No. 5,603,595 "Flywheel Nut Separable Connector And Method" by W. D. Nygren, an attempt was made to take advantage of SMA technology to provide actuation initiation for a conventional nut and bolt, and to use the high pre-load forces therebetween to provide the primary separation forces, i.e. to rotate the nut to the point of separation. The nut, having a high helix angle or lead, is essentially a flywheel. It is torqued until the desired preload is achieved. Thereafter, the flywheel is latched. The latch is secured by a SMA spring. Upon heating the spring, the latch releases the flywheel, and the stored energy therein tends to cause the flywheel to initially rotate at high speed. The strain energy due to the pre-load is dissipated as the nut unwinds, and the stored energy in the flywheel continues to cause the nut to rotate until separation occurs. The advantages are numerous; high pre-loaded joints are possible, and the need to only heat a small wire spring greatly reduces actuation time. However, this design had problems in that it had a greater parts count than equivalent explosive actuated separation nuts and was somewhat more massive and occupied more volume.

Thus it is a primary object of the invention to provide a fastener assembly that automatically separates upon actuation.

It is another primary object of the invention to provide a non-pyrotechnically actuated fastener assembly.

It is a further object of the invention to provide a fastener assembly that automatically separates upon actuation and absorbs the stored energy produced by the pre-loading of the fastener to reduce shock loads.

It is a still further object of the invention to provide a fastener assembly that automatically separates upon actuation and is easily re-settable.

It is a still further object of the invention to provide a fastener assembly that has low-mass, volume and parts count.

SUMMARY OF THE INVENTION

The invention is a separable connector assembly for joining two surfaces together. In detail, the invention includes a first fastener half, typically a nut, translationally mounted to a first surface. The first fastener half includes a threaded end with a selected thread geometry including a selected thread pitch diameter, thread lead angle, and helix angle. Preferably, the selected helix angle is between 18 degrees and 45 degrees, the selected thread angle is between 0 degrees and 30 degrees (7 degrees is preferred), and the selected thread lead is between 0.5 thread pitch diameters and 1.5 thread pitch diameters.

A hollow first housing having a cylindrical wall with a specific thickness is mounted to a second surface. A second fastener half, typically a bolt, is rotatably mounted within the hollow first housing. This second fastener half is generally threadably engagable with the threaded end of the first fastener half. A first mechanism or means is included for releasably restraining the rotatably supported second fastener half from rotating. It includes a cylindrical wall having a plurality of rectangular slots. A plurality of cylindrical rollers is generally movably mounted in the slots. These rollers generally have a diameter greater than the thickness of the cylindrical wall of the first housing. The second fastener half includes a plurality of cylindrical grooves having a depth less than the diameter of the cylindrical rollers. These grooves are generally alignable with the slots in the second fastener half. A coil spring (wrap spring) is wound about the cylindrical wall of the first housing. This coil spring is at least generally movable from a first position to a second position. In the first position, the coil spring generally engages the rollers forcing the rollers into the grooves locking the body to the cylindrical wall of the first housing. In the second position, the coil spring generally allows the rollers to move out of the slots in the second fastener half.

A second mechanism or means is mounted on the first housing to wind the spring about the cylindrical wall of the first housing such that the spring is moved from the second position to the first position. Preferably, the second mechanism includes a circular shaped ratchet assembly mounted about the first housing. The ratchet assembly includes a first member having flexible pawl springs rigidly attached to the first housing and a second member in the form of a ratchet rotatably mounted to the first housing and attached to the first end of the spring. A third mechanism releasably restrains the second end of the wrap spring from moving. Thus, when the third mechanism restrains the second end of the spring and when the ratchet member of the ratchet assembly is rotated, the wrap spring is wound about the first housing from the second position to the first position thereof.

The third mechanism or means is mounted on the first housing and coupled to the second end of the spring at least when the spring is in the first position. When the third mechanism releases the spring, the spring can move to the second position. Preferably, the third mechanism includes a shaft rotatably mounted within the first housing movable from a first position to a second position, the shaft having a cam surface that restrains the second end of the spring when the shaft is in the first position and releases the second end of the spring when the shaft is in the second position. A shaft lever is attached to the shaft for moving the shaft from the first position to the second position. When in the first position, the wrap spring biases the shaft lever to rotate the shaft lever to the second position. A balanced latch lever and spring assembly secures the lever such that the shaft is in the first position. The balanced latch lever is acted upon by SMA wires. Upon heating by the application of electrical current, each of the SMA wires returns to its original shortened length rotating the balanced latch lever and so releases the shaft lever releasing the shaft and, of course, the wrap spring.

A fourth mechanism or means is provided for restraining the threaded end of the first fastener half from rotating. Preferably, this fourth mechanism or means comprises a hollow second housing mountable to the first surface, wherein this hollow second housing comprises an opening having a cross-section configured for receiving the non-circular cross-sectional portion of the first fastener half. Finally, a fifth mechanism or means is mounted on the first surface for applying a selected tensile load to the first fastener half. Preferably, this fifth mechanism or means comprises the first fastener half having a flange, and a plurality of set screws threadably mounted in the flange and engagable with the second housing. Thus, when the first fastener half is threadably engaged with the second fastener half, the set screws can be adjusted to engage the second housing causing the first and second fastener halves to be strained.

In addition, a sixth mechanism or means may be included for releasably securing the shaft of the third mechanism or means in the first location. Preferably, this sixth mechanism or means comprises a lever arm attached to the shaft, a balanced latch lever releasably engaging the lever arm, a biasing means (e.g., a compression spring) to urge the balanced latch lever into engagement with the lever arm, and a seventh mechanism or means for moving the balanced latch lever out of engagement with the lever arm. This seventh mechanism or means preferably comprises a shape memory wire attached between the balanced latch lever and the first housing such that when the wire is heated, the wire shortens causing the balanced latch lever to rotate out of contact with the lever arm.

Thus, when the first fastener half and the second fastener half are engaged to form a connection, and with a tensile load applied to the joined first fastener half causing the connection to be strained, the selected thread geometry causes the tensile load to be resolved as a torque applied to the second fastener half. This torque is generally sufficient to cause the second fastener half to rotate when released allowing the threaded end to translate out of engagement with the rotatably supported second fastener half when the mechanism releases the second fastener half allowing the connection to separate.

Preferably, the rotatably supported second fastener half has a selected mass moment of inertia and the selected thread geometry is such that less than 10 percent of the strain energy stored in the connection between the first fastener half and the rotatably supported second fastener half, not dissipated as heat due to friction, is converted into translational kinetic energy of the first fastener half during separation.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3A is a cross-sectional view of FIG. 2 taken along line 3—3 illustrating the connector assembly, particularly the roller pins, in the first (latched) position.

FIG. 3B is a cross-sectional view similar to FIG. 3A illustrating the connector assembly in the actuated condition.

FIG. 4A is a cross-sectional view of FIG. 2 taken along line 4—4 illustrating the connector assembly, particularly the spring biasing the roller pins, in the first non-actuated position.

FIG. 4B is a cross-sectional view similar to FIG. 4A illustrating the connector assembly, particularly the spring biasing the roller pins.

FIG. 6 is an exploded cross-sectional view of the connector assembly shown in FIG. 1.

DESCRIPTION OF THE PREFERRED EMBODIMENT

Figure 1:
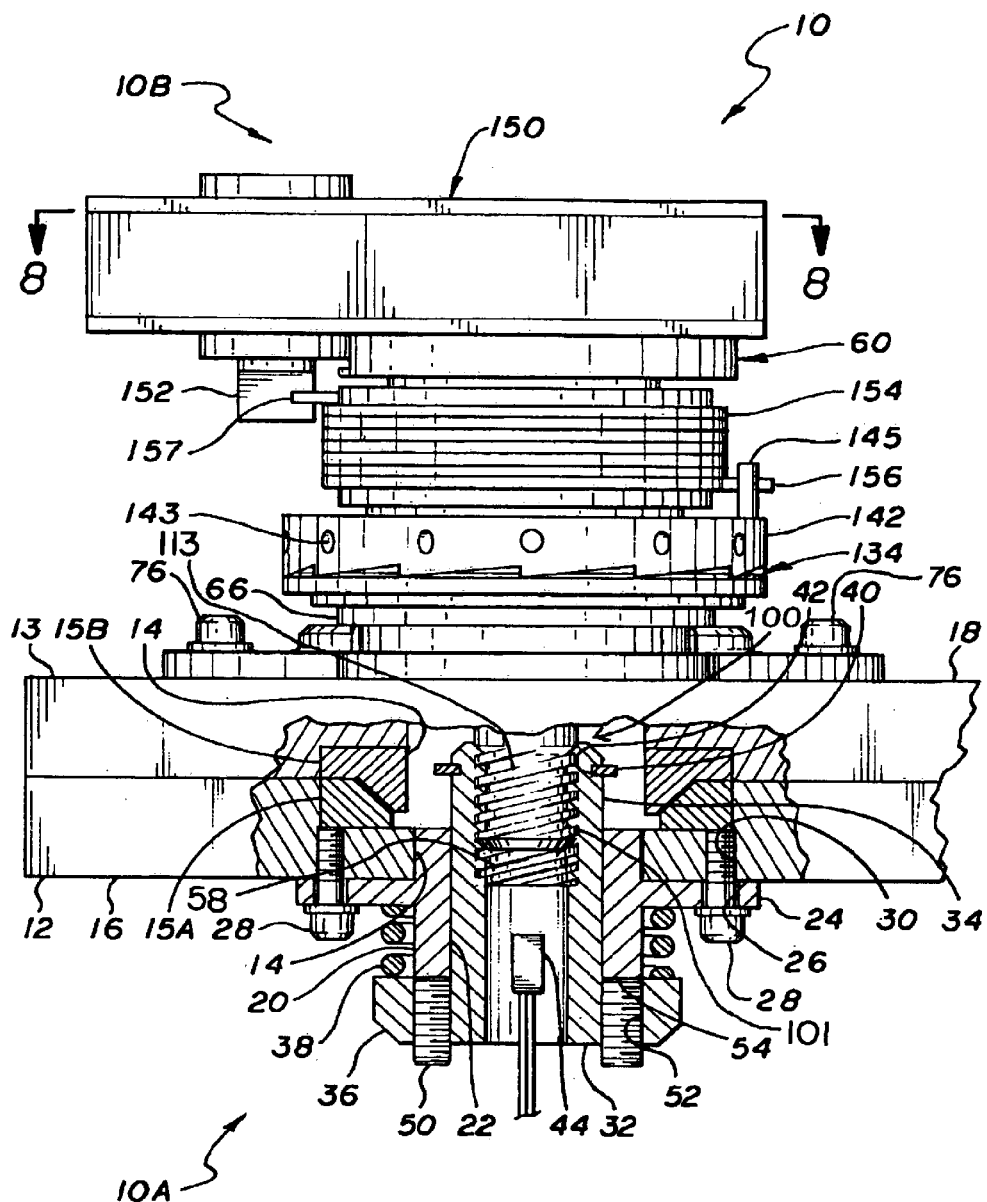
FIG. 1 is a partial cross-sectional view of the connector assembly shown connecting two structural elements together with the first part of the connector assembly in cross-section.
Figure 2:
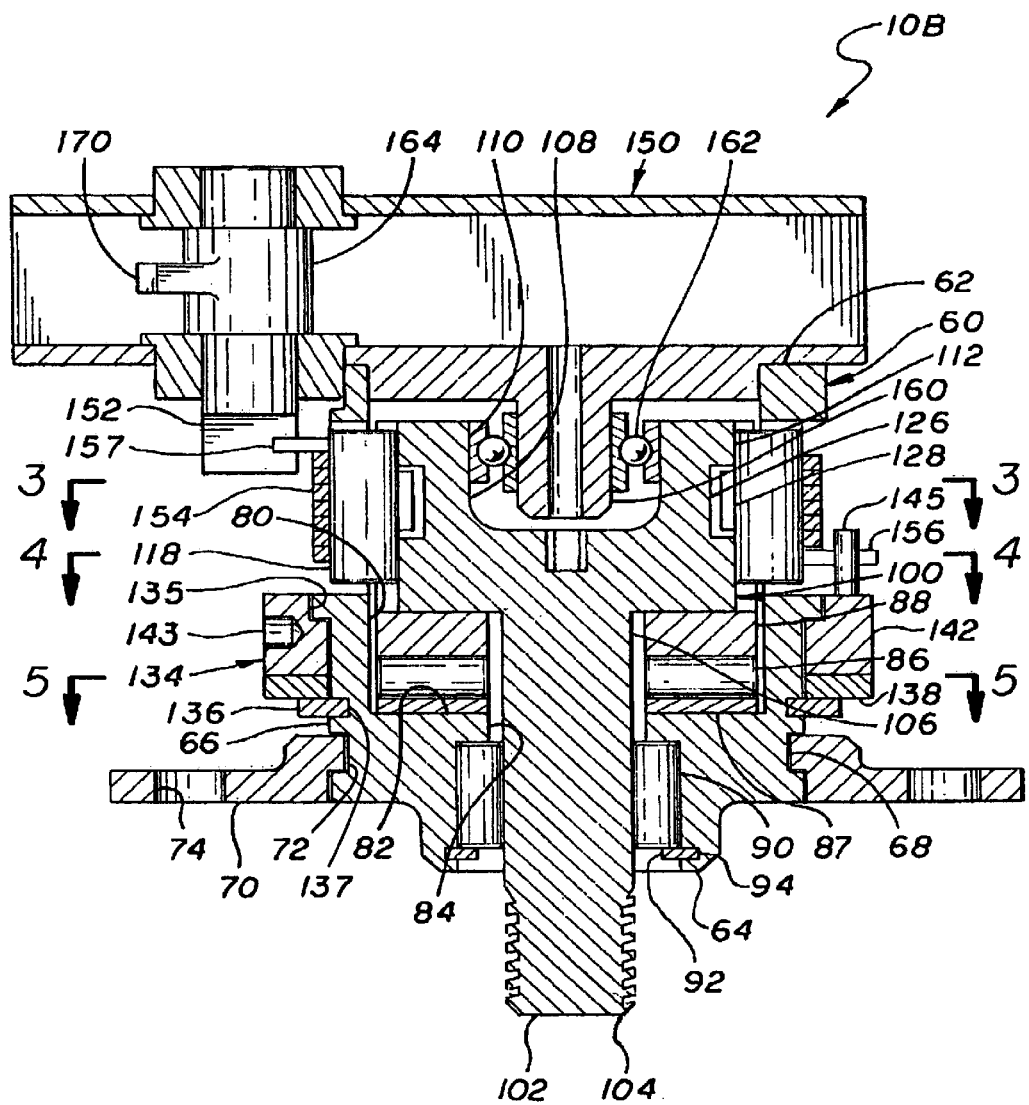
FIG. 2 is an enlarged cross-sectional view of FIG. 1 illustrating the second part of the connector assembly in cross-section.
Figure 5:
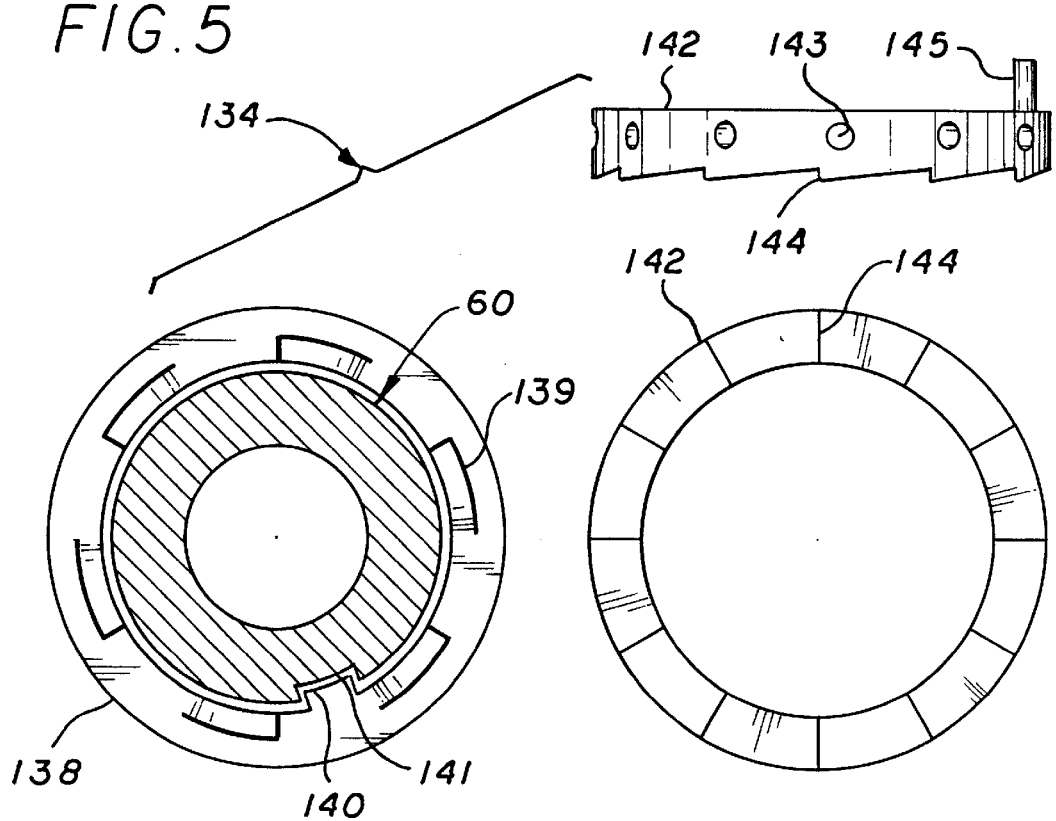
FIG. 5 is a cross-sectional view of FIG. 2 taken along line 5—5 illustrating the retention of the ratchet spring of the ratchet assembly.
Figure 8:
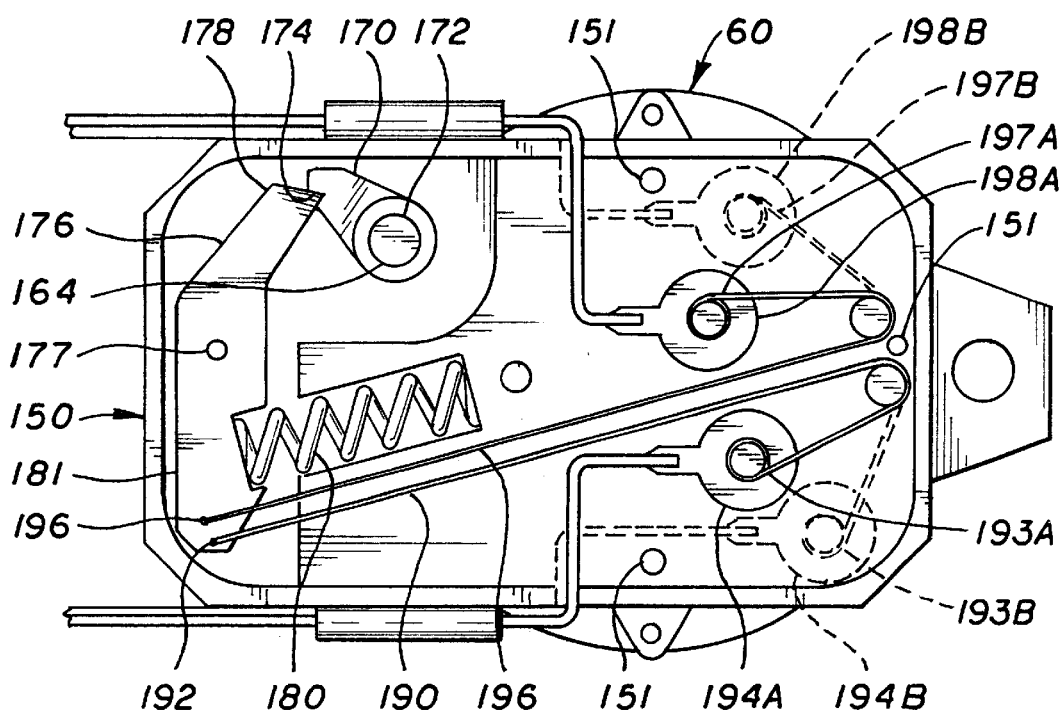
FIG. 8 is cross-sectional view of FIG. 1 taken along line 8—8.
Figure 7:
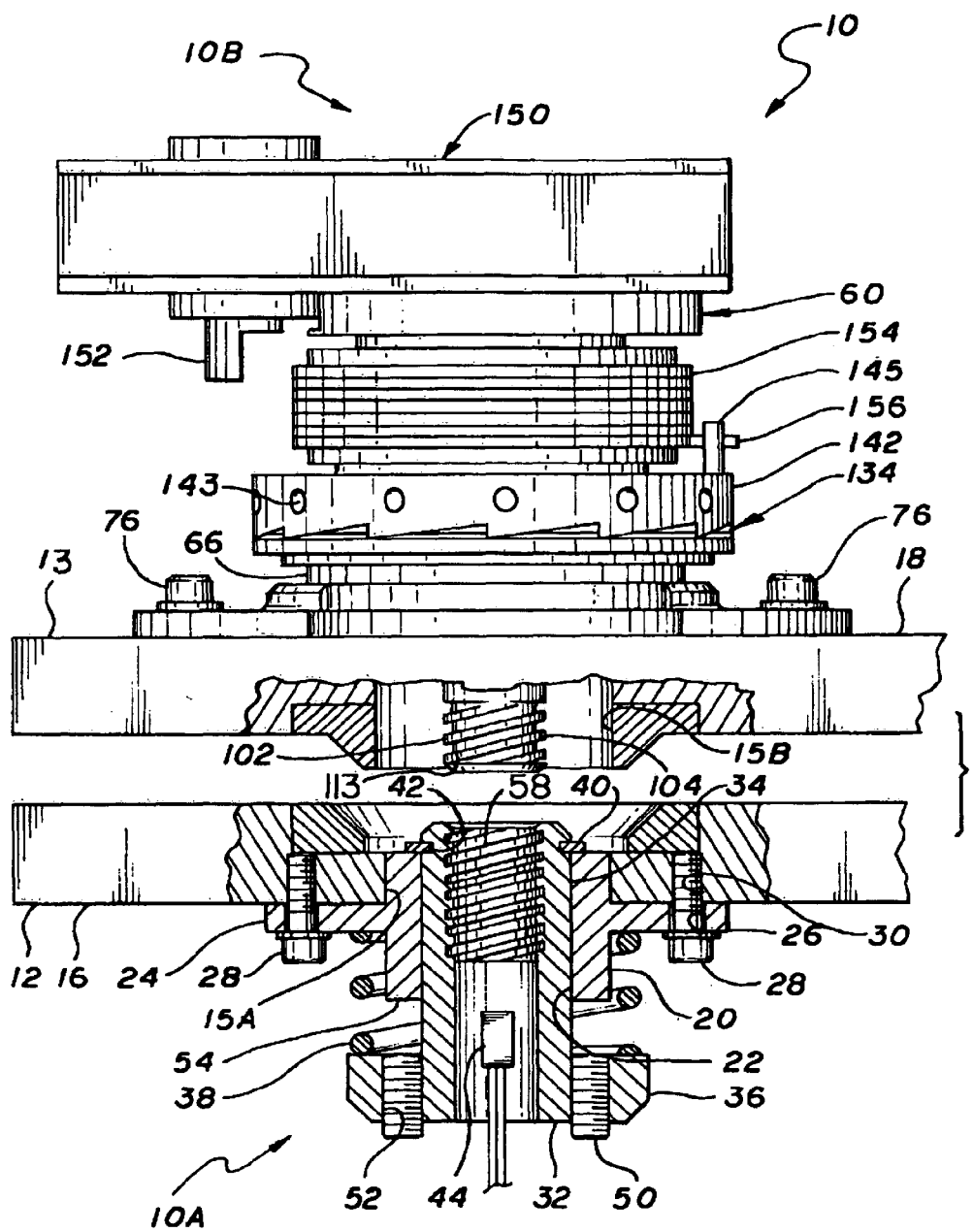
FIG. 7 is a cross-sectional view similar to FIG. 1 illustrating the connector assembly in the unlatched or actuated condition.

Referring to FIGS. 1–7, the connector assembly, generally designated by numeral 10, is used to join two structural elements 12 and 13, respectively, together having a hole 14 therethrough and structure alignment guides 15A and 15B. The connector assembly includes first connector half 10A mounted on surface 16 of structural element 12 and second connector half 10B mounted on surface 18 of structural element 13. Connector half 10A includes a hollow cylindrical member 20, having an internal square bore 22 and an external flange 24. The flange 24 includes fastener holes 26 having fasteners 28 engaging thread holes 30 in the surface 16 of structural element 12. A first hollow fastener half 32 having a square cross-sectional shape is slidably mounted within the bore 22 having an internally threaded nut portion 34, extending into the hole 14, and a flange 36. A spring 38 is mounted between the flange 24 and flange 36 biasing the fastener half 32 away from the surface 16. However, the first fastener half 32 is restrained within the cylindrical member 20 by a snap ring 40 mounted in a groove 42 on the external surface of the threaded nut portion 34. A strain gage 44 is mounted within the fastener half 32. A plurality of threaded screws 50 threadably engage thread holes 52 in the flange 36 and contact the end 54 of the tubular member 20. The function of the strain gage 44 and screws 50 will be subsequently discussed.

The second connector half 10B of the connector assembly 10 includes a hollow first housing 60 having an open first end 62 and a second end 64. The external surface 66 in proximity to the second end 64 of the housing 60 includes slots 68. Retainers 70 include end members 72 in engagement with the slots 68 and include fastener holes 74. Fasteners 76 extend through the holes 74 and engage threaded fastener holes 78 in the surface 18 of the structural element 13 securing the housing 60 thereto.

The housing 60 further includes a first cylindrical bore 80 extending from the first end 62 partially through toward the second end 64 terminating in a flat surface 82. A smaller diameter second cylindrical bore 84 extends from the flat surface 82 to the second end 64. A thrust bearing 86 sandwiched between washers 87 and 88 is mounted on the flat surface 82. Thus, this flat surface 82 of the first cylindrical bore 80 of the housing 60 may be characterized as a load bearing surface of sorts. A shaft bearing 90 is mounted in the bore 84 retained therein by a snap ring 92 mounted in groove 94. The housing 60 further includes a plurality of equally spaced vertical slots 96 extending through the wall (best seen in FIG. 6).

A second fastener half 100 is rotatably mounted within the first and second bores 80 and 84 comprising a bolt shaft 102 having a threaded first end 104 releasably engaged with the threaded portion 34 of the first fastener half 32 and a second end 106 coupled to a cup shaped member or head 108. The head (or cup shaped member) 108 of the second fastener half 100 may be characterized as a mass that is connected with the shaft 102 of the second fastener half 100. The cup shaped member 108 includes an interior opening 110, and an external surface 112 including a plurality of equally spaced vertical grooves 114 alignable with the slots 96 in the wall of the housing 60, and tapered in depth along the circumference (see FIG. 4B). Cylindrical roller pins 118 are mounted in the slots 96 and are extendable into the grooves 114. The width 120 of housing wall and maximum depth 122 of the grooves 114 have a geometric relationship with a radius equal to half the diameter 124 of the roller pins 118. Thus, with the roller pins 118 at the maximum depth within the grooves 114, the roller pins are approximately flush with the external surface of the housing 60.

The cup shaped member 108 of the second fastener half 100 further includes a circumferential groove 126 in which is mounted a ring shaped spring member 128. The spring member 128 has an uncompressed diameter greater than the diameter of the bore 80 and includes pins 130 that slidably engage holes 132 in the housing 60. Thus the spring member 128 generally functions as a biasing mechanism or means for biasing the roller pins 118 outward. A ratchet assembly 134 is mounted on the housing 60 abutting a small flange 135 (best seen in FIG. 2) and held there by a snap ring 136 in a groove 137. The ratchet assembly 134 includes a ratchet spring 138 having upward directed spring loaded teeth 139 (best seen in FIG. 5) and an inward directed tang 140 that engages a slot 141 on the housing 60. A rotatable ratchet ring 142 with rigid teeth 144 is mounted between the ratchet spring 138 and the flange 135. The ratchet ring 142 further includes spanner wrench holes 143 and a pin 145. The function of the ratchet assembly will be subsequently discussed.

A second housing 150 is mounted to the second end 62 of the housing 60 and includes a rotatable cam 152. A wrap spring 154, preferably having a square cross-section, is wound about the housing 60 engaging the rollers 118, has a first end 156 in engagement with the pin 145 of the rotatable ratchet ring 142, and has a second end 157 in releasable engagement with the cam 152. With the wrap spring 154 wound tightly about the housing 60, the rollers 118 are forced in the grooves 114 in the cup shaped member 108 preventing the second fastener half 100 from rotating. When the wrap spring 154 is released it has a larger diameter than the housing and the rollers 118 are thus free to move outward forced thereby by the torque on the second fastener half 100 in combination with the shape of the grooves 114. The spring member 128 prevents the rollers 118 from bouncing back. Thus the second fastener half 100 is free to rotate.

The second housing 150 is attached to housing 60 by means of fasteners 151 that engage threaded holes (not shown) in the second end 64 of the housing 60. The housing 150 includes a shaft 160 that extends into the cup shaped member 108. A bearing 162 is mounted within the cup shaped member 108 that also engages the shaft and thus the shaft 160 provides additional rotational support for the second fastener half 100. The cam 152 is mounted to a shaft 164 rotatably mounted within the housing 150. A lever arm 170 is mounted to the opposite end 172 of the shaft 164 that includes a notch 174. A balanced latch lever 176 is rotatably mounted within the housing 150 about a mounting pin 177 having a first end 178 in engagement with the notch 174 of the lever arm 170. A compression spring 180 is coupled to the balanced latch lever 176 near its second end 181 such that the first end 178 thereof is biased into engagement with the notch 174 of the lever arm 170 biasing the cam 152 into engagement with the second end 157 of the wrap spring 154 such that it remains tightly wound around the housing 60 forcing the rollers 118 into engagement with the grooves 114 in the cup shaped member 108 of the second fastener half 100 preventing it from rotating. This compression spring 180 may thus be characterized as a biasing mechanism or means for urging the balanced latch lever 176 into engagement with the lever arm 170.

A first SMA wire 190 extends through hole 192 in the second end 181 of the latch lever 176 and is attached by its ends 193A and 193B to terminals 194A and 194B. A second SMA wire 195 extends through a second hole 196 in the second end 181 of the latch lever 176 and is connected by its ends 197A and 197B to the terminals 198A and 198B. Both sets of terminals 194A, B and 198A, B are connected to a source of electrical power (not shown).

Thus with the lever arm 170 prevented from rotating by the latch lever 176 which is biased to prevent rotation away from the lever arm 170, the cam 152 prevents the second end 157 of the wrap spring 154 from moving. The first and second connector assembly halves 10A and 10B are on the structural elements 12 and 13. The first fastener half 32 can then be threadably engaged with the second fastener half 100. To accomplish this, a hole 200 is provided in the shaft 160 and a hex socket 202 is provided in the second fastener half 100. Thus an Alan wrench (not shown) can be inserted through the hole 200 such that it engages the socket 202 and used to thread the second fastener half 100 to the first fastener half 32 and to align the grooves 114 with the rollers 118. With the first end 156 of the wrap spring 154 in engagement with the pin 145 of the ratchet assembly 134, the ratchet ring 142 can be rotated with a spanner wrench (not shown) wrapping the spring about the housing 60 causing the rollers 118 to be forced into the grooves 114, preventing the first fastener half from rotating. Thereafter, the tension load on the first and second fastener halves 32 and 100 can be adjusted by adjusting screws 50 and monitored by monitoring the tension load utilizing strain gage 44.

When an electrical current is applied to the SMA wire(s) 190 and/or 196, each wire will heat up and return to its unstressed state and shorten. This causes the balanced latch lever 176 to rotate causing it to release the lever arm 170. This of course will allow the cam 152 to disengage from the end 157 of the wrap spring 154 allowing it to unwind freeing the rollers 118 and allowing them to move out of contact with the grooves 114. At this point in time the second fastener half 100 is free to rotate.

Upon proper selection of the internal threads 58 of the first fastener half 32 and external threads 113 of the second fastener half 100, and proper tensioning of a connection 101 between the first fastener half 32 and the second fastener half 100, the second fastener half 100 automatically and rapidly unthreads from the first fastener half 32 upon release of the second fastener half 100. This is particularly true if the threads have a thread angle between zero and 30 degrees (preferably 7 degrees), helix angles of between 18 and 45 degrees and second (both half) fastener leads of between 0.5 and 1.5 pitch diameters. The important criteria is that the selected thread geometry generates, under the load, a sufficiently high torque to overcome the rotationally resistive load bearing friction torque of the thrust bearing 86 acting on the second fastener half 100, and the resistive torque due to thread friction from the thread end engagement of the first fastener half 32 and the second fastener half 100. The theoretical calculations in support of this design are found in U.S. Pat. No. 5,603,595 "Flywheel Nut Separable Connector" by W. D. Nygren, Jr., incorporated by reference herein. Once released, the first fastener half 32 (being biased away from the second fastener half 100 by spring 38) retracts but is prevented from leaving the hollow, cylindrical member 20 by the snap ring 40.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to the fastener manufacturing industry.

What is claimed is:

1. A separable connector assembly comprising:
   a first fastener half including a threaded end having a selected thread geometry including a selected thread pitch diameter, thread lead angle, and helix angle;
   a hollow housing having a cylindrical wall with a specific thickness;
   a second fastener half rotatably mounted within said hollow housing, said second fastener half threadably engagable with said threaded end of said first fastener half;
   first means for releasably restraining said second fastener half from rotating, said first means comprising:
   said cylindrical wall of said housing having a plurality of rectangular slots;
   a plurality of cylindrical rollers movably mounted in said slots, said cylindrical rollers having a diameter greater than said thickness of said cylindrical wall of said housing;
   said second fastener half having a plurality of cylindrical grooves having a depth less than the diameter of said cylindrical rollers, said cylindrical grooves alignable with said slots in said second fastener half; and a wrap spring wound about said cylindrical wall of said housing and movable from a first position to a second position, such that when said spring is in said first position, said spring engages said rollers forcing said rollers into said grooves locking said second fastener half to said cylindrical wall of said housing when said grooves are aligned with said slots, and such that when said spring is in said second position, said spring allows said rollers to move out of said slots in said housing;

second means for winding said wrap spring about said cylindrical wall of said housing such that said wrap spring is moved from said second position to said first position;

third means for releasing said wrap spring when in said first position such that when said third means releases said wrap spring, said wrap spring is moveable to said second position;

fourth means for restraining said threaded end of said first fastener half from rotating; and fifth means for applying a tensile load to said first fastener half, such that when said first fastener half and said second fastener half are engaged to form a connection, and when the tensile load applied to said first fastener half causes the connection to be strained, the selected thread geometry causes the tensile load to be resolved as a torque applied to said second fastener half sufficient to cause said second fastener half to rotate when released, allowing said threaded end to translate out of engagement with said second fastener half when said first and third means release said second fastener half allowing said connection to separate.

2. The assembly as set forth in claim 1 wherein said selected helix angle is between 18 degrees and 45 degrees.

3. The assembly as set forth in claim 1 wherein said selected thread angle is between zero degrees and 30 degrees.

4. The assembly as set forth in claim 1 wherein said selected thread lead is between 0.5 thread pitch diameters and 1.5 thread pitch diameters.

5. The assembly as set forth in claim 1 wherein said second fastener half has a selected mass moment of inertia, and wherein said selected thread geometry of said first fastener half is such that less than 10 percent of strain energy stored in the connection between said first fastener half and said second fastener half, which is not dissipated as heat due to friction, is converted into translational kinetic energy of said first fastener half during separation.

6. The assembly as set forth in claim 1, or 2, or 3, or 4, or 5, wherein:

said wrap spring includes first and second ends;
said second means comprises:
  a circular shaped ratchet assembly mounted about said housing, said ratchet assembly having a ratchet spring rigidly attached to said housing and a ratchet ring rotatably mounted to said housing and attached to said first end of said wrap spring; and
said third means coupled to said second end of said wrap spring such that when said third means restrains said second end of said wrap spring and said ratchet ring of said ratchet assembly is rotated, said wrap spring is wound about said housing from said second position to said first position thereof.

7. The assembly as set forth in claim 1 wherein said third means comprises:

a shaft rotatably mounted within said housing and movable from a first location to a second location, said shaft having a cam surface which restrains said second end of said wrap spring when said shaft is in said first location and releases said second end of said wrap spring to enable said shaft to move to said second location;

a lever attached to said shaft for moving said shaft from said first location to said second location;

a compression spring biasing said lever to rotate said shaft to said second location; and sixth means for releasably securing said lever such that said shaft is in said first position.

8. The assembly as set forth in claim 7 further comprising a biasing means for biasing said rollers toward said wrap spring.

9. An assembly for releasably connecting a first surface to a second surface comprising:

a first fastener half having a first threaded end, said first fastener half translatably mountable to said first surface;

a first hollow housing mountable to said second surface, said first hollow housing having a cylindrical wall;

a second fastener half rotatably mounted within said first hollow housing, wherein said second fastener half is threadably engagable with said first threaded end of said first fastener half;

first means for releasably restraining said second fastener half from rotating, said first means comprising:
  said cylindrical wall of said first hollow housing having a plurality of rectangular slots;
  a plurality of cylindrical rollers movably mounted in said slots, said rollers having a diameter greater than said thickness of said cylindrical wall of said housing;
  said second fastener half having a plurality of cylindrical grooves having a depth less than the diameter of said cylindrical rollers, said grooves alignable with said slots in said second fastener half; and
  a wrap spring wound about said cylindrical wall of said first hollow housing and movable from a first position to a second position, such that when said wrap spring is in said first position said wrap spring engages said rollers forcing said rollers into said grooves locking said second fastener half to said cylindrical wall of said first hollow housing when said grooves are aligned with said slots, and such that when said wrap spring is in said second position said wrap spring allows said rollers to move out of said slots in said first hollow housing;

second means for winding said wrap spring about said cylindrical wall of said first hollow housing such that said wrap spring is moved from said second position to said first position;

third means for releasing said wrap spring when in said first position such that, when said third means releases said wrap spring, said wrap spring is moveable to said second position;

fourth means, mountable to said first surface, for restraining said first threaded end of said first fastener half from rotating; and fifth means, mountable to said first surface, for applying a tensile load to said first fastener half, such that when said first fastener half and said second fastener half are engaged to form a connection, and when a tensile load applied to said first fastener half causes strain energy to be stored in the connection, the tensile load is resolved as a torque applied to said second fastener half sufficient to cause said second fastener half to rotate when released, wherein said second fastener half translates out of engagement with said threaded end of said first fastener half separating the connection.

10. The assembly as set forth in claim 9 further comprising:

said first hollow housing having a load bearing surface; and said second fastener half comprising a threaded shaft and a mass supported about said threaded shaft, wherein said mass of said second fastener half is at least generally supported by said load bearing surface of said first hollow housing.

11. The assembly as set forth in claim 10 wherein said second fastener half is rotatably supported by a bearing disposed between said mass of said second fastener half and said load bearing surface of said first hollow housing.

12. The assembly as set forth in claim 9 wherein:

a portion of said first fastener half comprises a non-circular cross-section; and said fourth means comprises a second hollow housing mountable to the first surface, wherein said second hollow housing comprises an opening with a cross-section for receiving said portion of said first fastener half.

13. The assembly as set forth in claim 12 wherein said fifth means comprises:

said first fastener half having a flange; and a plurality of set screws threadably mounted in said flange and engagable with said second hollow housing, such that when said first fastener half is threadably engaged with said second fastener half, said set screws can be adjusted to engage said second hollow housing causing said first and second fastener halves to be strained.

14. The assembly as set forth in claim 9, or 10, or 11, or 12, or 13, wherein:

said wrap spring includes first and second ends;

said second means comprises:

a circular shaped ratchet assembly mounted about said first hollow housing, said ratchet assembly having a ratchet spring rigidly attached to said first hollow housing and a ratchet ring rotatably mounted to said first hollow housing and attached to said first end of said wrap spring; and said third means is coupled to said second end of said wrap spring such that when said third means restrains said second end of said wrap spring and said ratchet ring of said ratchet assembly is rotated, said wrap spring is wound about said first hollow housing from said second position to said first position thereof.

15. The assembly as set forth in claim 9 wherein said third means comprises:

a shaft rotatable relative to said first hollow housing and movable from a first location to a second location, said shaft having a cam surface which restrains said second end of said wrap spring when said shaft is in said first location and releases said first end of said wrap spring when said shaft is in said second location; and sixth means for releasably securing said shaft in said first location.

16. The assembly as set forth in claim 15 wherein said sixth means comprises:

a lever arm attached to said shaft;

a balanced latch lever releasably engaging said lever arm;

a biasing means to urge said balanced latch lever into engagement with said lever arm; and seventh means for moving said balanced latch lever out of engagement with said lever arm.

17. The assembly as set forth in claim 16 wherein said seventh means to move said balanced latch lever comprises a shape memory wire attached to said balanced latch lever such that when said wire is heated said wire shortens causing said balanced latch lever to rotate out of contact with said lever arm.

* * * * *